United States Patent
Deger et al.

(10) Patent No.: US 10,955,577 B2
(45) Date of Patent: Mar. 23, 2021

(54) SYSTEMS AND METHODS FOR EVALUATION OF FORMATION SHEAR SLOWNESS

(71) Applicant: Schlumberger Technology Corporation, Sugar Land, TX (US)

(72) Inventors: Evgeniya Deger, Kanagawa (JP); Naoki Sakiyama, Tokyo (JP); Hiroshi Hori, Kanagawa-ken (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 495 days.

(21) Appl. No.: 15/884,458

(22) Filed: Jan. 31, 2018

(65) Prior Publication Data
US 2019/0235107 A1    Aug. 1, 2019

(51) Int. Cl.
*G01V 1/40* (2006.01)
*G01V 1/44* (2006.01)
(Continued)

(52) U.S. Cl.
CPC .............. *G01V 1/284* (2013.01); *G01V 1/303* (2013.01); *G01V 1/48* (2013.01); *G01V 1/50* (2013.01); *G01V 1/44* (2013.01)

(58) Field of Classification Search
CPC . G01V 1/284; G01V 1/48; G01V 1/50; G01V 1/44; G01V 1/303
(Continued)

(56) References Cited

U.S. PATENT DOCUMENTS 6,678,616 B1    1/2004 Winkler et al.
2006/0233047 A1* 10/2006 Zeroug .................. G01V 1/44
                                                        367/25
(Continued)

FOREIGN PATENT DOCUMENTS

WO    2017059151 A1    4/2017
WO    2017165341 A2    9/2017
WO    2017172810 A1    10/2017

OTHER PUBLICATIONS

Xia, J., Miller R. D., Park, C. B., Estimation of Near-Surface Shear Wave Velocity by Inversion of Rayleigh Waves, Geophysics, 1999 64, pp. 691-700 (Year: 1999).*
(Continued)

*Primary Examiner* — Ian J Lobo (57) ABSTRACT

Systems and methods for determining a shear wave slowness may include emitting an emitted acoustic wave within a borehole from an acoustic tool. A return acoustic wave may be detected via one or more sensors. The return acoustic wave may be generated when the emitted acoustic wave interacts with a physical feature within the borehole. A signal may be generated that may be indicative of the return acoustic wave. The method may include evaluating the signal via a processor to determine a pseudo-Rayleigh mode slowness and calculating a shear wave slowness using an analytical relationship. The analytical relationship may include a mathematical correlation between the pseudo-Rayleigh mode slowness and the shear wave slowness. The analytical relationship may also include input parameters that are measured physical parameters of borehole properties.

12 Claims, 8 Drawing Sheets

(51) Int. Cl.
　　　*G01V 1/50* 　　　(2006.01)
　　　*G01V 1/28* 　　　(2006.01)
　　　*G01V 1/30* 　　　(2006.01)
　　　*G01V 1/48* 　　　(2006.01)
(58) Field of Classification Search
　　　USPC .......................................................... 367/31
　　　See application file for complete search history.

(56) References Cited

U.S. PATENT DOCUMENTS

| 2013/0077437 | A1* | 3/2013 | Mulargia | ................ | G01V 1/48 367/31 |
| 2015/0253447 | A1 | 9/2015 | Mukhopadhyay et al. | | |
| 2017/0314385 | A1 | 11/2017 | Hori et al. | | |

OTHER PUBLICATIONS

Van Der Hijden, J.H.M.T, Quantitative analysis of the pseudo-Rayleigh phenomenon, Journal of the Acoustical Society of America. 75 (4), pp. 1041-1047. Apr. 1984.

Viktorov, Igor. Rayleigh and Lamb Waves, Physical Theory and Applications. 1967. pp. 46-47. Springer Science Business Media. New York, New York, USA.

Zhu et al. Leaky Rayleigh and Scholte waves at the fluid-solid interface subjected to transient point loading. Oct. 2004. Journal Acoustical Society of America. vol. 116., No. 4. Pt. 1. pp. 2101-2110.

International Preliminary Report on Patentability issued in International Patent application PCT/US2019/015751 dated Aug. 4, 2020, 8 pages.

\* cited by examiner

SYSTEMS AND METHODS FOR EVALUATION OF FORMATION SHEAR SLOWNESS

BACKGROUND

This disclosure relates to evaluating a shear wave slowness within a borehole using various analytical and/or empirical methods to analyze measurements taken by an acoustic downhole tool.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as an admission of any kind.

Producing hydrocarbons from a borehole drilled into a geological formation is a remarkably complex endeavor. In many cases, hydrocarbon exploration and production may be informed by measurements from downhole well-logging tools and sensors that are conveyed deep into the borehole. The measurements may be used as part of the drilling process itself or to infer properties and characteristics of the geological formation surrounding the borehole. For example, an acoustic tool may be used to emit acoustic energy (e.g., sound waves) into the borehole and evaluate a return of the acoustic energy when the acoustic energy interacts with various features that surround the borehole. The returned acoustic energy may be used to determine the porosity, density, and/or additional parameters of the geological formation.

In some cases, the acoustic tool may be instructed to detect measurements that include a pseudo-Rayleigh mode and a shear wave traveling through the borehole. The pseudo-Rayleigh mode propagates substantially close the speed of the shear wave, such that an expected detection time of the pseudo-Rayleigh mode is shortly after an expected detection time of the shear wave. However, because a dominant energy, generally manifested as the amplitude, of the pseudo-Rayleigh mode may be higher than a dominant energy of the shear wave, it is difficult to differentiate the shear wave amongst propagations of the pseudo-Rayleigh mode. During drilling, it may be desirable to detect and determine a slowness of the shear wave to generate an azimuthal slowness map of the shear wave. Yet because the energy of the pseudo-Rayleigh mode may dwarf that of the shear wave, it may be difficult to differentiate a shear wave from a pseudo-Rayleigh mode in an acoustic measurement.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one example, a method for determining a shear wave slowness may include emitting an emitted acoustic wave within a borehole from an acoustic tool. The method may also include detecting a return acoustic wave via one or more sensors. The return acoustic wave may be generated when the emitted acoustic wave interacts with a physical feature within the borehole. The method further includes generating a signal that may be indicative of the return acoustic wave. The method may include evaluating the signal via a processor to determine a pseudo-Rayleigh mode slowness and calculating a shear wave slowness using an analytical relationship. The analytical relationship may include a mathematical correlation between the pseudo-Rayleigh mode slowness and the shear wave slowness. The analytical relationship may also include input parameters that are measured parameters of physical borehole properties.

In another embodiment, a method for determining a shear wave slowness may include emitting an emitted acoustic wave within a borehole from an acoustic tool and detecting a return acoustic wave via one or more sensors of the acoustic tool. The method may also include evaluating the return acoustic wave via a processor and determining borehole parameters of the borehole with the processor. The method may further include inputting the borehole parameters into a numerical modeling software. The borehole parameters may include a first set of data. The method may include evaluating the first set of data to determine a relationship between a pseudo-Rayleigh mode slowness and a first shear wave slowness associated with the first set of data. The method may also include adjusting a parameter of the borehole parameters to generate a second set of data to determine a second shear wave slowness associated with second set of data. The method may further include generating a numerical database using the first shear wave slowness associated with the first set of data and the second shear wave slowness associated with the second set of data.

In another embodiment, a method for determining a shear wave slowness may include emitting an emitted acoustic wave into a borehole from an acoustic tool and detecting a return acoustic wave via one or more sensors of the acoustic tool. The return acoustic wave may include a pseudo-Rayleigh mode slowness. The method may also include evaluating borehole parameters using the pseudo-Raleigh mode slowness and categorizing the detected pseudo-Rayleigh mode slowness and the borehole parameters in a numerical database. The method may further include determining an empirical relationship between the pseudo-Rayleigh mode slowness and a shear wave slowness using the numerical database.

Various refinements of the features noted above may be undertaken in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are examples of the presently disclosed techniques. Additionally, in an effort to provide a concise description of these embodiments, the features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The oil and gas industry includes a number of sub-industries, such as exploration, drilling, logging, extraction, transportation, refinement, retail, and so forth. During exploration and drilling, boreholes may be drilled into the ground for reasons that may include discovery, observation, or extraction of resources. These resources may include oil, gas, water, or any combination of elements within the ground.

Boreholes, sometimes called wellbores, may be straight or curved holes drilled into the ground from which resources may be discovered, observed, and/or extracted. The creation of a borehole may involve boring through a geological formation using a drill bit coupled to the end of a drill string. The drill string may include a multitude of sensors that measure and/or monitor the drilling process and logging information about the borehole. For example, an acoustic tool may couple to the drill string and emit acoustic waves (e.g., sound waves) within the borehole. The acoustic waves, which may include vibrations, may propagate, reflect, refract, and/or transmit differently within the borehole depending on the physical attributes of the borehole that the waves encounter. The acoustic tool may detect and evaluate the return acoustic waves to collect a variety of information relating to the geological formation and the state of drilling in the borehole. For example, the acoustic tool may measure parameters of the geological formation such as density, porosity, resistivity, lithology, and so forth.

The acoustic tool may emit relatively high frequency acoustic waves (e.g., ultrasonic waves), which enables the acoustic tool to localize the high frequency acoustic waves along a certain borehole azimuth (e.g., a directional vector extending perpendicular to a central axis of the borehole). The high frequency acoustic waves may interact with the borehole, such that returned high frequency acoustic waves may be received by the acoustic tool and converted to digital data signals indicative of the pseudo-Rayleigh modes for each borehole azimuth. The methods disclosed herein may use the data signals generated by the acoustic tool to estimate the shear wave slowness of each borehole azimuth. Independent signals indicative of a shear wave slowness along a respective azimuth of the borehole may thus be generated. The signals may be compiled to generate an azimuthal slowness map of the borehole. As such, the methods discloses herein may enable the shear wave slowness to be estimated using the pseudo-Rayleigh mode measured by the acoustic tool, and, by extension, may enable the generation of an azimuthal shear wave slowness map of the borehole.

Figure 1:
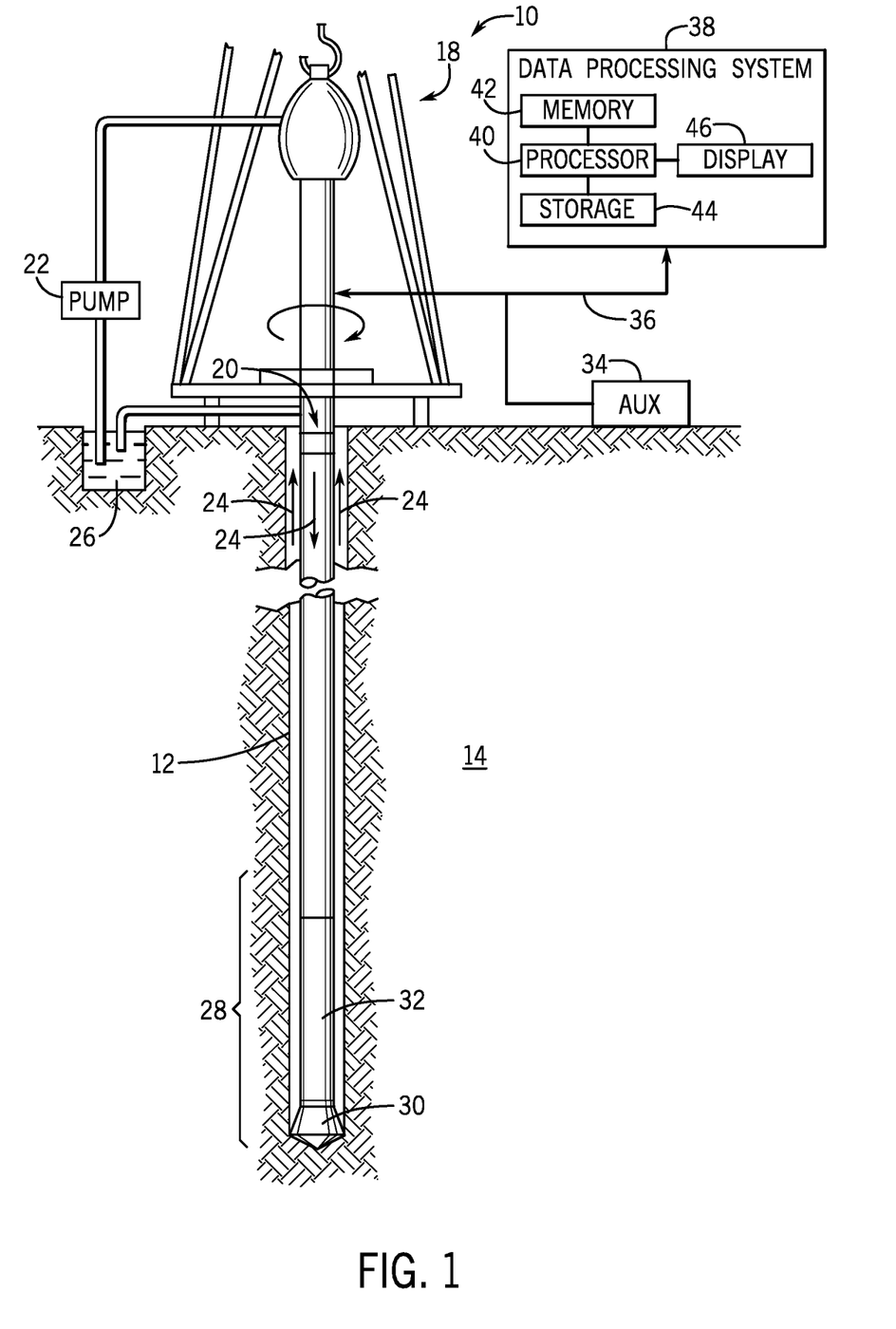
FIG. 1 is a schematic diagram of a drilling system including an acoustic tool, in accordance with an embodiment of the present disclosure.

With the foregoing in mind, FIG. 1 illustrates a drilling system 10 that may employ the systems and methods of this disclosure. The drilling system 10 may be used to drill a borehole 12 into a geological formation 14. In the drilling system 10, a drilling rig 18 may rotate a drill string 20 within the borehole 12. As the drill string 20 is rotated, a drilling fluid pump 22 may be used to pump drilling fluid, which may be referred to as "mud" or "drilling mud," downward through the center of the drill string 20, and back up around the drill string 20, as shown by reference arrows 24. At the surface, return drilling fluid may be filtered and conveyed back to a mud pit 26 for reuse. The drilling fluid may travel down to the bottom of the drill string 20 known as the bottom-hole assembly (BHA) 28. The drilling fluid may be used to rotate, cool, and/or lubricate a drill bit 30 that may be a part of the BHA 28. The fluid may exit the drill string 20 through the drill bit 30 and carry drill cuttings away from the bottom of the borehole 12 back to the surface.

The BHA 28 may include the drill bit 30 along with various downhole tools, such as an acoustic tool 32. The BHA 28 may thus convey the acoustic tool 32 through the geological formation 14 via the borehole 12. As described in greater detail herein, the acoustic tool 32 may be any suitable downhole tool that emits acoustic waves (e.g., sound waves, ultrasonic waves) within the borehole 12 (e.g., a downhole environment). The downhole tools, which may include the acoustic tool 32, may collect a variety of information relating to the geological formation 14 and the state of drilling in the borehole 12. For instance, the downhole tools may be LWD tools that measure physical properties of the geological formation 14, such as density, porosity, resistivity, lithology, and so forth. Likewise, the downhole tools may be measurement-while-drilling (MWD) tools that measures certain drilling parameters, such as the temperature, pressure, orientation of the drill bit 30, and so forth.

As discussed further below, the acoustic tool 32 may receive energy from an electrical energy device or an electrical energy storage device, such as an auxiliary power source 34 or another electrical energy source to power the tool. In some embodiments, the acoustic tool 32 may include a power source within the acoustic tool 32, such as a battery system or a capacitor to store sufficient electrical energy to emit and/or receive acoustic waves.

Communications 36, such as control signals, may be transmitted from a data processing system 38 to the acoustic tool 32, and communications 36, such as data signals related to the results/measurements of the acoustic tool 32, may be returned to the data processing system 38 from the acoustic tool 32. The data processing system 38 may be any electronic data processing system that can be used to carry out the systems and methods of this disclosure. For example, the data processing system 38 may include one or more processors 40, which may execute instructions stored in memory 42 and/or storage 44. The memory 42 and/or the storage 44 of the data processing system 38 may be any suitable article of manufacture that can store the instructions. The memory 42 and/or the storage 44 may be read-only memory (ROM), random-access memory (RAM), flash memory, an optical storage medium, or a hard disk drive, to name a few examples. A display 46, which may be any suitable electronic display, may display images generated by the processor 40. The data processing system 38 may be a local component of the drilling system 10 (i.e., at the surface), within the acoustic tool 32 (i.e., downhole), a device located proximate to the drilling operation, and/or a remote data processing device located away from the drilling system 10 to process downhole measurements in real time or sometime after the data has been collected. In some embodiments, the data processing system 38 may be a mobile computing device (e.g., tablet, smart phone, or laptop) or a server remote from the drilling system 10. In some embodiments, the acoustic tool 32 may store and process collected data in the BHA 28, or send the data to the surface for processing via communications 36 described above, including any suitable telemetry (e.g., electrical signals pulsed through the geological formation 14 or mud pulse telemetry using the drilling fluid).

Figure 2:
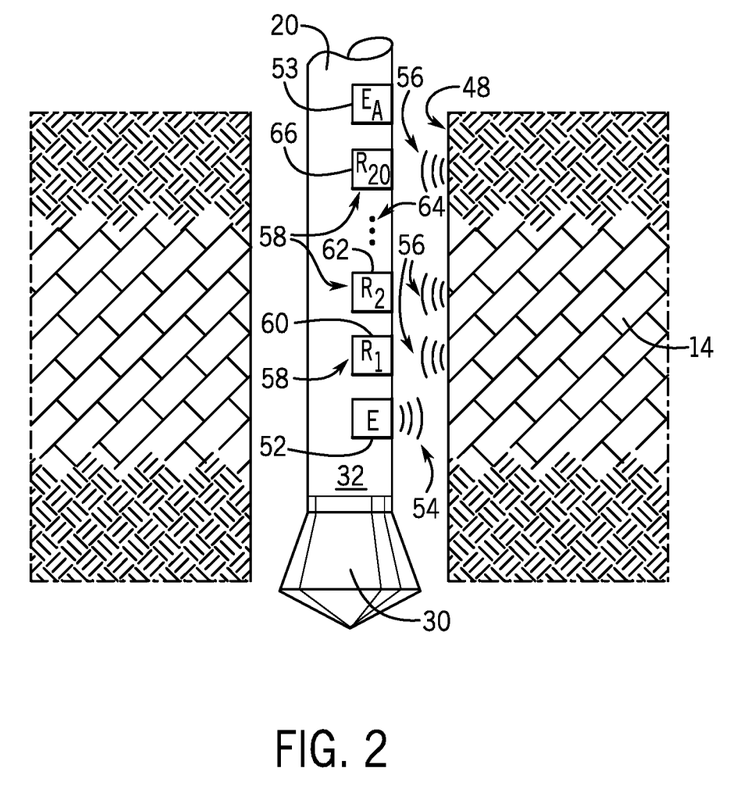
FIG. 2 is a schematic diagram of the acoustic tool of FIG. 1, which is used to measure a pseudo-Rayleigh mode within a borehole, in accordance with an embodiment of the present disclosure.

FIG. 2 illustrates a magnified schematic view of a portion of the BHA 28 near the acoustic tool 32. The acoustic tool 32 may obtain acoustic evaluation data relating to the presence of solids, liquids, or gases within the geological formation 14. For example, the acoustic tool 32 may obtain measurements of acoustic impedance, flexural attenuation, formation slowness, and/or mud slowness, which may be used to determine whether portions of the geological formation 14 are a solid, or not solid. The acoustic tool 32 may send the obtained measurements to the data processing system 38. As discussed in greater detail herein, processing acoustic data may involve separating different modes of acoustic measurements to provide more accurate evaluation of measured borehole 12 parameters.

The acoustic tool 32 may be suitable for operating in a "pulse echo" technique involving a single trans-receiver that pulses an acoustic beam at normal incidence to an inner surface 48 of the borehole 12 (e.g., the geological formation 14) and receives the return echo energy. Specifically, an emitter 52 (which may be a piezoelectric transducer) in the acoustic tool 32 may emit acoustic waves 54 out toward the geological formation 14. The emitted acoustic waves 54 may return from the inner surface 48 of the geological formation 14, thus generating detected waves 56, which may travel towards the acoustic tool 32. In some embodiments, the emitter 52 may receive and measure the detected waves 56. The detected waves 56 may vary depending on physical characteristics of the geological formation 14 (e.g., density, porosity). Measurements of acoustic evaluation data thus may be obtained, integrated, and/or processed by the data processing system 38 to determine physical characteristics of the geological formation 14.

To this end, the acoustic tool 32 may include one or more receiver transducers 58 (which may also be piezoelectric transducers). For example, the acoustic tool 32 may include a first receiver transducer 60, a second receiver transducer 62, multiple intermediate receiver transducers (as indicated by reference markers 64), and a final (e.g., here, twentieth) receiver transducer 66. In some embodiments, the acoustic tool 32 may include fewer or more than twenty receiver transducers 58. The acoustic tool 32 may be suitable for operating in a "pitch-catch" technique using the emitter 52 and the receiver transducers 58, where one or more emitters 52 and receiver transducers 58 are oriented to transmit acoustic signals and receive returned acoustic signals, respectively. Specifically, the emitter 52 in the acoustic tool 32 may emit acoustic energy 54 (e.g., sound waves, ultrasonic waves) out toward the geological formation 14 resulting in the detected waves 56, which are measured by the receiver transducers 58. In some embodiments, the acoustic tool 32 may include an additional emitter 53, which enables the acoustic tool 32 to operate using a borehole compensation (BHC) technique. In such embodiments, the receiver transducers 58 may be disposed between the emitter 52 and the additional emitter 53. For example, the additional emitter 53 may be disposed axially above the receiver transducers 58, while the emitter 52 may be disposed axially below the receiver transducers 58. As discussed above, the data processing system 38 may evaluate the acoustic data (e.g., the detected waves 56) received by the acoustic tool 32 to determine characteristics of the geological formation 14.

The acoustic tool 32 may emit acoustic waves of any suitable frequency for pitch-catch measurements. In some cases, the frequency or frequencies may be between 20 kilohertz (kHz) to 1 Megahertz (MHz). When the emitted frequency of the acoustic tool 32 is high, the acoustic tool 32 may acquire localized measurements corresponding to a certain borehole azimuth (e.g., a directional vector perpendicular to and relative to a central axis of the borehole 12). The acoustic tool 32 may thus acquire independent signals corresponding to measurements taken along different azimuths of the borehole 12. The signals may be evaluated (e.g., via the data processing system 38) and used to generate an azimuthal map of the geological formation 14 surrounding the borehole 12.

A pseudo-Rayleigh mode (also sometimes referred to as a pseudo-Rayleigh wave or a surface wave) may be emitted from the acoustic tool 32 as the interface mode that propagates between the acoustic tool 32 and the geological formation 14. In some embodiments, an expected arrival time (e.g., after emission from the acoustic tool 32) of the pseudo-Rayleigh mode is after an expected arrival time of a shear wave (as shown in greater detail in FIG. 6). Due to limited spacing between the emitter 52 and the receiver transducers 58, measuring, and thus differentiating, an arrival time of the shear wave from an arrival time of the pseudo-Rayleigh mode may be difficult. In addition, an energy (e.g., an amplitude) of the pseudo-Rayleigh mode may be higher than the energy of the shear wave, making it difficult to detect the shear wave amongst the pseudo-Rayleigh mode. Because the energy of the pseudo-Rayleigh mode propagates substantially close the speed of the shear wave, an estimation of the shear wave slowness may be obtained using measurements of the pseudo-Rayleigh mode.

Figure 3:
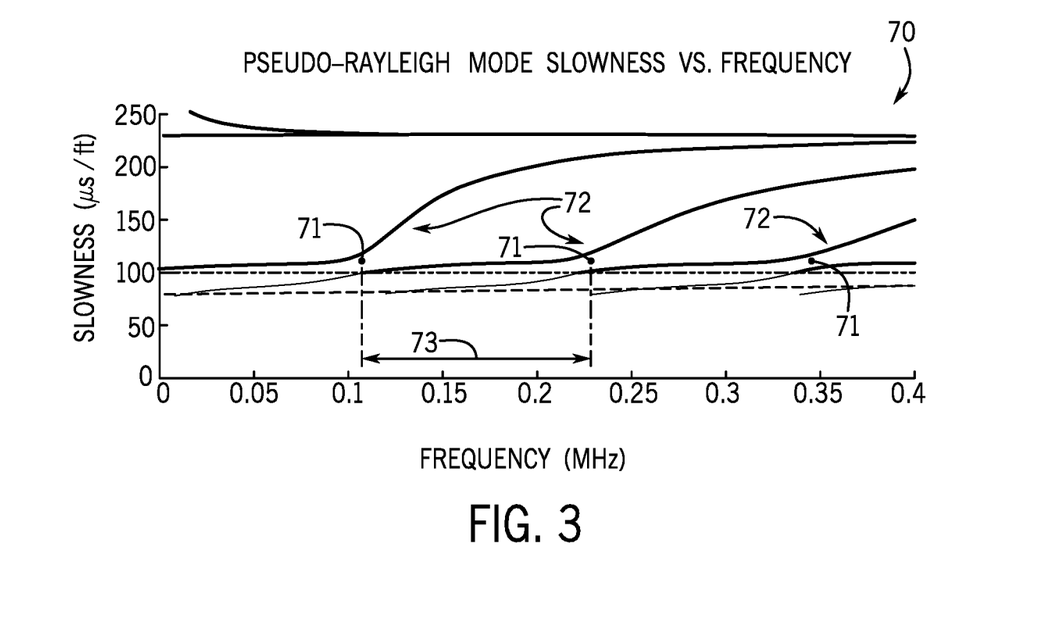
FIG. 3 is a graph illustrating a measured correlation between a pseudo-Rayleigh mode slowness and a frequency of the pseudo-Rayleigh mode, in accordance with an embodiment of the present disclosure.
Figure 4:
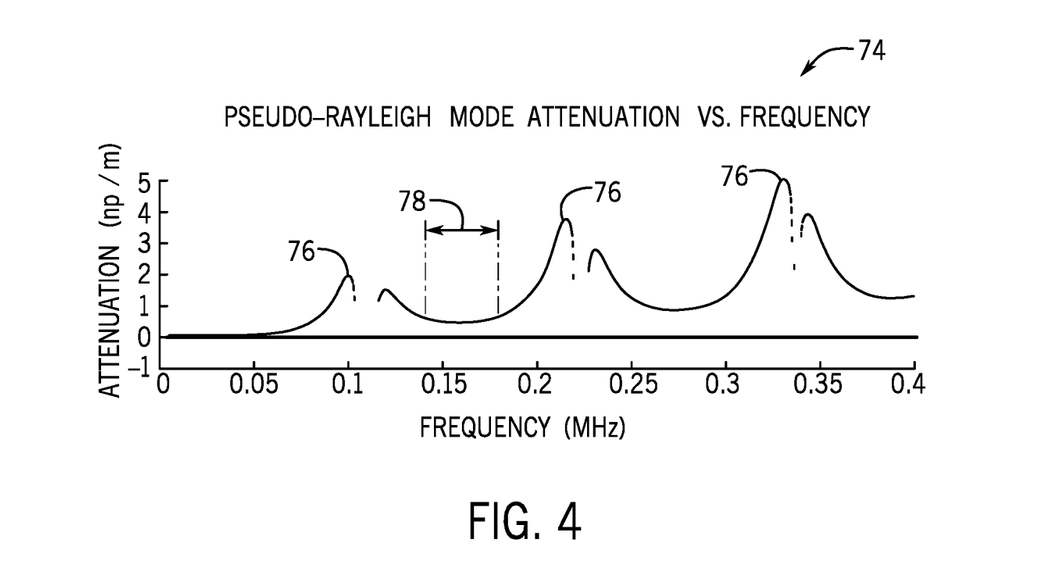
FIG. 4 is a graph illustrating a measured correlation between an attenuation of the pseudo-Rayleigh mode and the frequency of the pseudo-Rayleigh mode, in accordance with an embodiment of the present disclosure.

FIG. 3 is an embodiment of a graph 70 illustrating a relationship between a slowness of certain pseudo-Rayleigh modes and a frequency of certain pseudo-Rayleigh modes measured by the acoustic tool 32. The pseudo-Rayleigh modes may travel between the acoustic tool 32 and the geological formation 14 (e.g., the inner surface 48). The various measured pseudo-Rayleigh modes are indicated by lines 72. The slowness of the pseudo-Rayleigh mode may be dispersive with regard to the frequency of the pseudo-Rayleigh mode. In other words, the slowness of the pseudo-Rayleigh mode may rise substantially at a threshold frequency (e.g., as indicated via points 71). A slowness of the pseudo-Rayleigh wave may remain substantially constant (e.g., may not attenuate or may attenuate at a sufficiently low rate as not to substantially affect a measurement of the pseudo-Rayleigh wave), while within a certain frequency spectrum 73. For example, FIG. 4 is a graph 74 illustrating a relationship between an attenuation of a pseudo-Rayleigh mode and a frequency of a pseudo-Rayleigh mode. The attenuation of the pseudo-Rayleigh mode may reach a maximum value 76 at certain threshold frequencies of the pseudo-Rayleigh mode. The attenuation of the pseudo-Rayleigh mode may be relatively small while in a certain frequency range 78. In some cases, the frequency spectrum 73 may contain frequencies with the frequency range 78. In some embodiments, the pseudo-Rayleigh mode may not attenuate at a certain slowness above a shear wave slowness within the geological formation 14. This relationship may enable the shear wave slowness to be estimated by measuring the pseudo-Rayleigh mode slowness within a geological formation 14 and evaluating the pseudo-Rayleigh mode slowness via the various methods disclosed herein.

Figure 5:
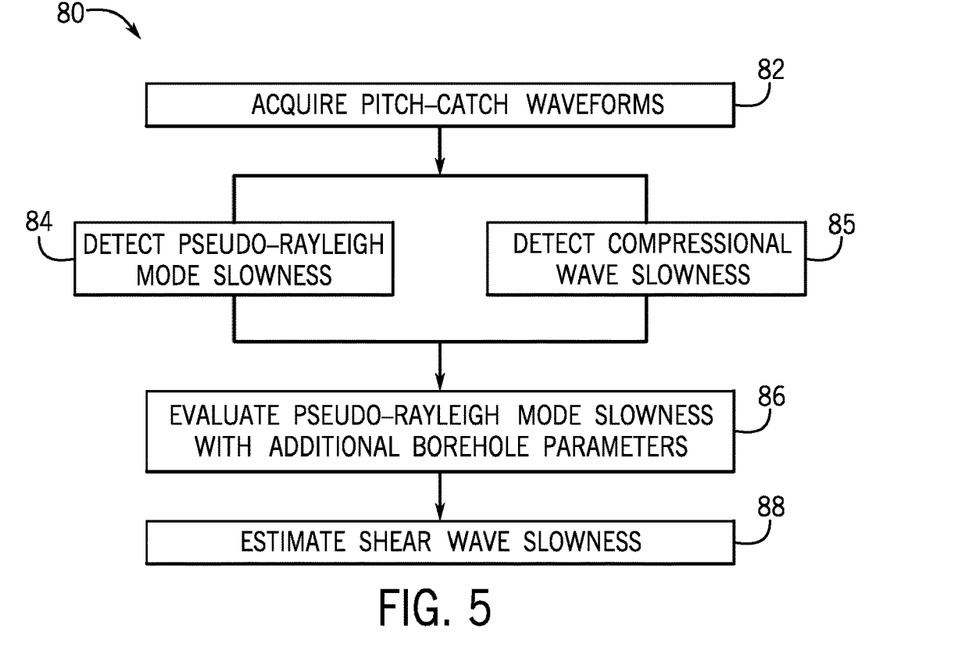
FIG. 5 is a flowchart of a method for estimating a shear wave slowness using the measured pseudo-Rayleigh mode, in accordance with an embodiment of the present disclosure.

For example, flow chart 80, as shown in FIG. 5, describes an embodiment of a method to estimate the shear wave slowness from a pseudo-Rayleigh mode slowness, beginning with acquiring pitch-catch waveforms using the acoustic tool 32 (process block 82). As described above, the acoustic signals (e.g., acoustic waves 54) may be emitted by the emitter 52 of the acoustic tool 32. The acoustic waves 54 may interact with the geological formation 14 and return to the acoustic tool 32 as detected waves 56. In some embodiments, the data processing system 38 may control the emission of the acoustic waves 54. For example, the data processing system 38 may control a frequency, a wavelength, and/or a pulse of the acoustic waves 54. Detected waves 56, such as the pseudo-Rayleigh modes, may be detected by the receiver transducers 58 of the acoustic tool 32 (process block 84). In some embodiments, the acoustic tool 32 may detect parameters indicative of compressional waves (e.g., "P" waves) in addition to the pseudo-Rayleigh modes (process block 85). For example, the acoustic tool 32 may receive instructions from the data processing system 38 to detect certain wavelengths of the returned waves known to be associated with the pseudo-Rayleigh modes, compressional waves, or any additional waveform. The acoustic tool 32 may thus detect and measure the pseudo-Rayleigh mode slowness or the pseudo-Rayleigh mode slowness and a compressional wave slowness within the borehole 12.

The acoustic tool 32 may send signals indicative of parameters (e.g., wavelength, amplitude, frequency) of the detected pseudo-Rayleigh mode to the data processing system 38, which may evaluate the shear wave slowness from the parameters (process block 88). For example, additional parameters measured within the borehole 12, including geophysical and/or petrophysical parameters, may be input and used in the described methods with the detected pseudo-Rayleigh mode slowness to estimate the shear wave slowness. In some embodiments, the geophysical and/or petrophysical parameters may be determined using the pitch-catch and/or the pulse-echo measurements described above. For example, a surface roughness estimation of the borehole 12 may be determined using pulse-echo measurements taken by the acoustic tool 32. In some embodiments, the surface roughness estimation may be used as an input parameter in the methods described below to estimate the shear wave slowness of the geological formation 14. Additionally or otherwise, geophysical and/or petrophysical parameters of the borehole 12 may be determined using any suitable logging methods known in the art. The present disclosure thus describes multiple methods which may be used to evaluate the shear wave slowness form the pseudo-Rayleigh mode, as described in the flow charts shown in FIGS. 6, 7, and 8.

Analytical Estimation of Shear Wave Slowness from Pseudo-Rayleigh Mode

Figure 6:
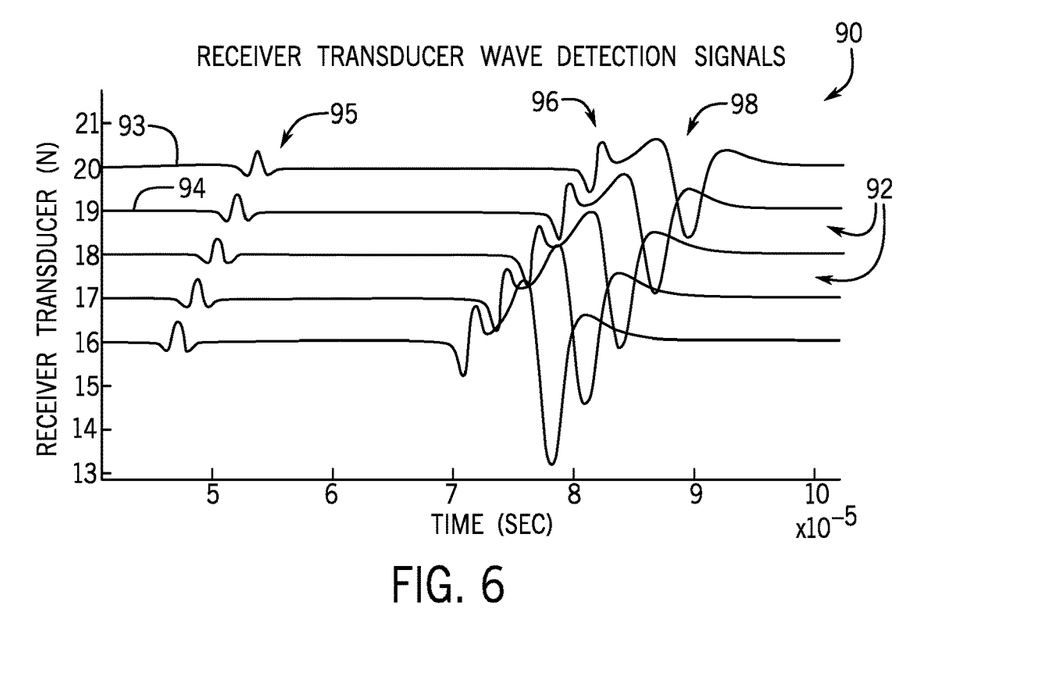
FIG. 6 is a graph illustrating signals generated by receiver transducers of the acoustic tool of FIG. 2, in accordance with an embodiment of the present disclosure.

Shear wave slowness may be analytically estimated using pseudo-Rayleigh mode measurements. FIG. 6 is a graph 90 illustrating a magnitude (e.g., an amplitude) of acoustic signals 92 (e.g., the detected waves 56) that may be recorded by the acoustic tool 32. As discussed above, the acoustic tool 32 may emit acoustic waves 54 towards the geological formation 14 and record the detected waves 56 via the receiver transducers 58. Each receiver transducer (e.g., the first receiver transducer 60, the second receiver transducer 62, the intermediate receiver transducers 64, the final (e.g., twentieth) receiver transducer 66) may generate a respective acoustic signal 92. Because the receiver transducers 58 may be located along various axial positions on the acoustic tool 32, a detection time of each receiver transducer may vary. For example, an axial length between the first receiver transducer 60 and the emitter 52 may be less than an axial length between the twentieth receiver transducer 66 and the emitter 52. A signal 93 generated by the twentieth receiver transducer 66 may thus lag relative to a signal 94 generated by an intermediate receiver transducer 64 (e.g., a nineteenth receiver transducer), which is positioned closer (e.g., at a lesser axial length) to the emitter 52.

The acoustic tool 32 may be instructed to detect various waveforms within the geological formation 14, such as a "P" wave (e.g., the compressional wave), the shear wave, and the pseudo-Rayleigh mode. As shown in the illustrated example of the graph 90, a detection time of a "P" wave peak 95 may be substantially prior to a detection time of a shear wave peak 96. A pseudo-Rayleigh mode peak 98 may be detected after the shear wave peak 96. As discussed above, an expected time interval between the detection of the pseudo-Rayleigh mode and the shear wave may be substantially small. Because a dominant energy (e.g., an amplitude) of the pseudo-Rayleigh mode may be higher than a dominant energy of the shear wave, it is difficult to differentiate the shear wave (e.g., the shear wave peak 96) amongst returned acoustic energy associated with the pseudo-Rayleigh mode (e.g., the pseudo-Rayleigh mode peak 98).

Figure 7:
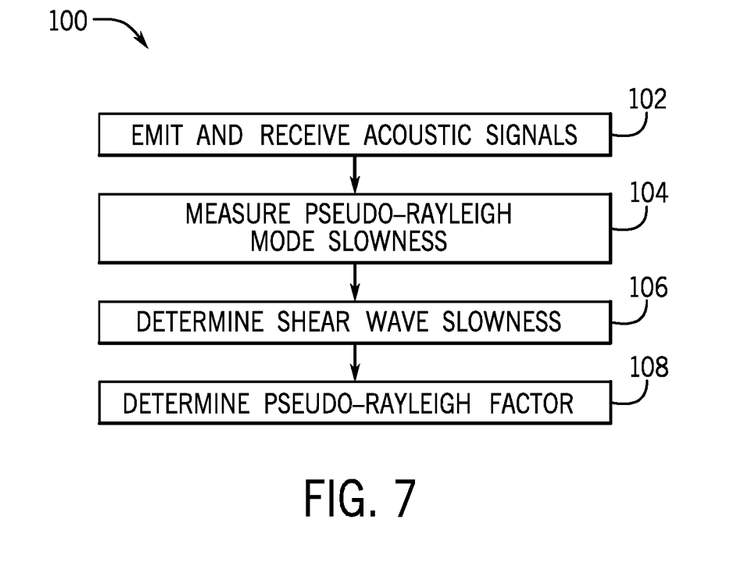
FIG. 7 is a flowchart of a method for estimating the shear wave slowness using an analytical relationship between the shear wave slowness and the measured pseudo-Rayleigh mode, in accordance with an embodiment of the present disclosure.

Flow chart 100, as shown in FIG. 7, describes an embodiment of a method that may be used to estimate the shear wave slowness using the measured pseudo-Rayleigh mode slowness. For example, an analytical relationship may correlate the measured pseudo-Rayleigh mode to a calculated (e.g., an estimated) shear wave slowness. The analytical relationship may simulate a fluid-solid interface problem, which may be approximated by a two layer model (e.g., a fluid-solid half space without presence of the acoustic tool 32). The analytical relationship may enable the generation of an azimuthal slowness map of the shear wave slowness surrounding the borehole 12. As discussed above, the acoustic tool 32 may emit acoustic waves 54 and receive detected waves 56 in independent azimuthal orientations surrounding the borehole 12 (process block 102). The acoustic tool 32 and/or the data processing system 38 may use the measured frequencies to determine the pseudo-Rayleigh mode for any suitable number of azimuthal directions within the borehole 12 (process block 104). Equation I (EQ I) below illustrates an embodiment of the analytical relationship that may be used to determine the shear wave slowness, $s_S$, using the measured pseudo-Rayleigh mode slowness, $p_{pR}$, from the acoustic tool 32 (process block 106):

$$F_{pR}(p) = \\ -s_S^4 \frac{\rho_f}{\rho_s} \frac{\sqrt{p^2 - s_P^2}}{\sqrt{p^2 - s_f^2}} + (2p^2 - s_S^2)^2 - 4p^2\sqrt{p^2 - s_P^2}\sqrt{(p^2 - s_S^2)}$$ (EQ I)

In Equation I, $\rho_f$ is indicative of the fluid density, $\rho_s$ is indicative of the solid density, $s_f$ is indicative of the fluid slowness, $s_S$ and is indicative of the solid compressional slowness. Equation I is used to derive shear wave slowness, $s_S$, assuming $F_{pR}(p_{pR})=F_{pR}(p)=0$, where $p_{pR}$ is indicative of the measured pseudo-Rayleigh mode slowness of in a particular azimuthal direction of the borehole 12. The fluid density, solid density, fluid slowness, and the solid compressional slowness can be determined using any suitable methods. For example, downhole tools including LWD tools may measure such physical properties of the geological formation 14.

The bias of slowness on pseudo-Rayleigh mode slowness with respect to the shear slowness may be qualitatively estimated by determining a pseudo-Rayleigh factor, $f_{pR}$ (process block 108). The pseudo-Rayleigh factor indicates whether a pseudo-Rayleigh mode may be found in a surrounding environment (e.g., a particular azimuthal direction) of the borehole 12 and/or the geological formation 14. The analytical relationship that may be used to determine the pseudo-Rayleigh factor is shown below as Equation 2 (EQ II):

$$f_{pR} = \frac{\rho_s}{\rho_f} \frac{\sqrt{s_f^2 - s_S^2}}{\sqrt{s_S^2 - s_P^2}}$$ (EQ II)

The relationship shown in Equation II may be solved using the shear wave slowness, $s_S$, determined in Equation I, and the fluid density, $\rho_f$, the solid density, $\rho_s$, the fluid slowness, $s_f$, and the solid compressional slowness, $s_P$. If the pseudo-Rayleigh factor $f_{pR}>1$, then a stable pseudo-Rayleigh mode may exist within the borehole 12 and/or the geological formation 14. The pseudo-Rayleigh factor may thus be used to determine whether an analytical approximation of the shear wave slowness, $S_s$, using Equation I, is applicable. In other words, parameters of the borehole 12 indicative of multiple, independent measurements taken along various azimuthal directions of the borehole 12 may be input into Equation I and Equation II, to determine the respective shear wave slowness of each azimuthal direction. The resulting shear wave slowness approximations may be compiled to generate an azimuthal shear wave slowness map of the borehole 12. As will be appreciated, multiple iterations of the calculations of Equation I and Equation II may be performed using parameters measured at several axial positions (e.g., at varying depths) within the borehole 12 to increase the accuracy (e.g., a resolution) of the azimuthal slowness map of the shear wave slowness.

Figure 8:
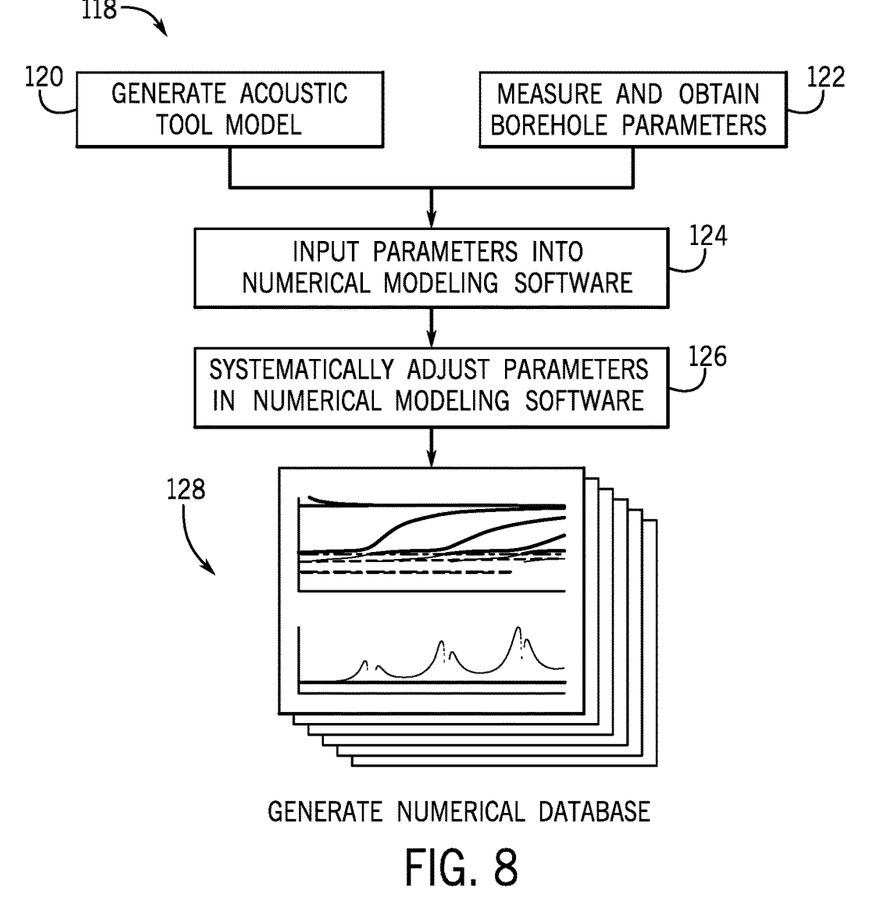
FIG. 8 is a flowchart of a method for estimating the shear wave slowness using a numerical data base that correlates the shear wave slowness and a calculated pseudo-Rayleigh mode, in accordance with an embodiment of the present disclosure.

Generating Numerical Database to Obtain Relationship between Pseudo-Rayleigh Mode Slowness and Shear Wave Slowness The relationship between pseudo-Rayleigh mode slowness and shear wave slowness may be obtained using a numerical database. A flow chart 118, as shown in FIG. 8, describes an embodiment of a method that may be used to generate a numerical database that correlates a calculated pseudo-Rayleigh mode indicative of certain borehole parameters to an estimated shear wave slowness of the borehole 12. The resultant numerical database may include a large number of datasets (e.g. 500 datasets, 1,000 datasets, 5,000 datasets, or more). For example, a model of the acoustic tool 32 may be generated using a computer-aided drafting and design (CADD) software (process block 120). The model may include various geometrical features of the acoustic tool 32, such as a position of the emitter 52 and the receiver transducers 58 relative to one another. Additionally or otherwise, the model may include geometric proportions of the acoustic tool 32 (e.g., a height, a length, a width) or any other suitable structural properties of the acoustic tool 32.

The method may include measuring and obtaining (e.g., storing in the memory 42) certain borehole parameters of the borehole 12 (process block 122). As discussed above, the parameters may be measured by the acoustic tool 32, or any suitable downhole tool coupled to the drill string 20. In some embodiments, the measured parameters may include the fluid density, $\rho_f$, the solid density, $\rho_s$, the fluid slowness, $s_f$, and the solid compressional slowness, $s_P$, a mud slowness, and/or a mud density. Additionally or otherwise, other geophysical and/or petrophysical parameters of the borehole 12 may be measured and recorded, such as stand-off, formation triaxial stresses, Thomsen parameters for anisotropic formations, surface roughness, porosity, and so on.

The model of the acoustic tool 32 and the measured borehole parameters may be input into numerical modeling circuitry or software (e.g., as input parameters to the numerical modeling circuitry or software) for analysis (process block 124). The numerical modeling circuitry or software may use the finite difference method (FDM), the finite element method (FEM), a finite volume method, and/or a spectral element method to evaluate the input parameters and estimate a pseudo-Rayleigh mode slowness correlating to these input parameters. The numerical modeling software may use the calculated pseudo-Rayleigh modes slowness to estimate a shear wave slowness correlating to the input parameter. The numerical modeling software may systematically adjust (e.g., increase in magnitude, decrease in magnitude) certain input parameters (e.g., the measured borehole parameters, proportions of the geometric shape of the acoustic tool 32) to determine an effect of each parameter on the shear wave slowness (process block 126). The numerical modeling software may run multiple iterations of simulation, in which a parameter of the initial input parameters is altered during each iteration.

For example, the numerical modeling software may run 100, 1000, 10,000, or more iterations in which various borehole parameters (e.g., $p_{pR}s_p$, $s_f$, $\rho_s$, $\rho_f$) are adjusted. The numerical modeling software may determine a shear wave slowness associated with each calculated pseudo-Rayleigh mode slowness. The numerical modeling software may thus record and store the calculated shear wave slowness associated with each adjustment in parameters (e.g., each calculated pseudo-Rayleigh mode). In some embodiments, the results of each simulation may be stored as a vector (e.g., a set of data) indicative of the shear wave slowness of the respective set of input parameters. A numerical data base may be generated by compiling each vector (e.g., each set of data), and numerically categorizing the vectors in a matrix (process block 128). An embodiment of a form of categorization of the numerical database is shown in Equation 3 (EQ III) below.

$$S_s = g(p_{pR}, s_p, s_f, \rho_s, \rho_f, \alpha, \beta) \qquad \text{(EQ III)}$$

In equation III, $\alpha$ and/or $\beta$ are indicative of additional borehole parameters such as the stand-off, formation triaxial stresses, Thomsen parameters for anisotropic formations, surface roughness, and/or the porosity. In some embodiments, Equation III may include additional or fewer parameters than those shown above. The numerical database may enable the shear wave slowness of the borehole 12 to be determined after acquiring certain input parameters (e.g., $p_{pR}$, $s_p$, $s_f$, $\rho_s$, $\rho_f$, $\alpha$, $\beta$) of Equation III. For example, for a particular borehole 12, the parameters $s_p$, $s_f$, $\pi_s$, $\pi_f$, $\alpha$, $\beta$ may be measured using the acoustic tool 32, or any additional downhole logging tool known in the art. The measured parameters $s_p$, $s_f$, $\rho_s$, $\rho_f$, $\alpha$, $\beta$ of the particular borehole 12 may be used to determine the shear wave slowness of the particular borehole 12, by looking up corresponding parameters, or similar parameters, in the numerical database. Thus, the numerical database may enable a shear wave slowness to be determined given a variety of know and/or measured parameters of a particular borehole 12.

Figure 9:
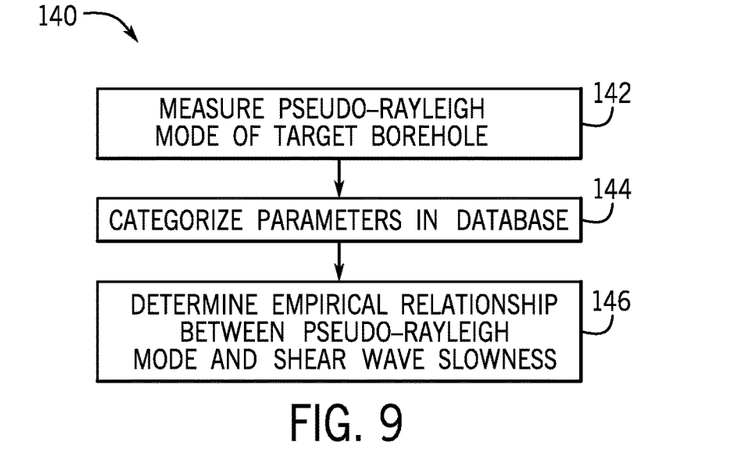
FIG. 9 is a flowchart of a method for estimating the shear wave slowness using a numerical data base that correlates the shear wave slowness and an empirically determined pseudo-Rayleigh mode, in accordance with an embodiment of the present disclosure.

Obtaining Empirical Relationship between Pseudo-Rayleigh Mode Slowness and Shear Wave Slowness Flow chart 140, as shown in FIG. 9, describes an embodiment of a method that may be used to obtain an empirical relationship between a pseudo-Rayleigh mode slowness and a shear wave slowness. The pseudo-Rayleigh mode slowness of a target borehole (e.g., a known test well, the borehole 12) may be determined using the acoustic tool 32, an additional acoustic tool (e.g., a microsonic tool), and/or another logging tool, as discussed above. In other words, the pseudo-Rayleigh mode slowness of the target borehole 12 may be measured and empirically determined (process block 142). The acoustic tool 32 may take multiple, independent measurements of the pseudo-Rayleigh mode slowness along different azimuthal directions of the borehole 12. In some embodiments, the measured pseudo-Rayleigh mode of each azimuthal direction may be stored as a respective vector (e.g., a set of data).

The acoustic tool 32, and/or the additional logging tools, may determine additional borehole parameters of each measured azimuthal direction of the borehole 12, such as the fluid density, $\rho_f$, the solid density, $\rho_s$, the fluid slowness, $s_f$, the solid compressional slowness, $s_p$, the formation density, the mud density, and/or the mud slowness. For example, the additional borehole parameters may be determined using the pitch-catch and/or the pulse-echo measurement techniques discussed above. The measurements of the additional borehole parameters may correspond to a particular azimuthal direction, and may be stored within a vector that is associated to a measured pseudo-Rayleigh mode corresponding to that same azimuthal direction. A data base may be generated by compiling each vector (e.g., including the measured pseudo-Rayleigh mode and the borehole parameters of a particular azimuthal direction), and numerically organizing the vectors (e.g., in a matrix). An example of a form of categorization of the database is shown in Equation 3 above. Thus, certain measured borehole parameters (e.g., $p_{pR}$, $s_p$, $s_f$, $\rho_s$, $\rho_f$, $\alpha$, $\beta$) associated which each measured pseudo-Rayleigh mode slowness may be categorized in a numerical database (process block 144).

Because the pseudo-Rayleigh mode may be determined empirically, the effects of gas, fluid, or other conditions within the borehole may be incorporated into the numerical database. As discussed above, the database may be organized as a matrix, in which each vector entry of the matrix includes the empirically measured pseudo-Rayleigh mode and the corresponding measured borehole parameters. The numerical modeling software may use the finite difference method (FDM), the finite element method (FEM), a finite volume method, and/or a spectral element method to evaluate the numerical database. The database may be used to determine an empirical relationship between the pseudo-Rayleigh mode and the shear wave slowness (process block 146). The shear wave slowness may thus be determined for each azimuthal direction using the numerical database. The numerical database may enable an azimuthal slowness map of the shear waves to be generated for the borehole 12.

Figure 10:
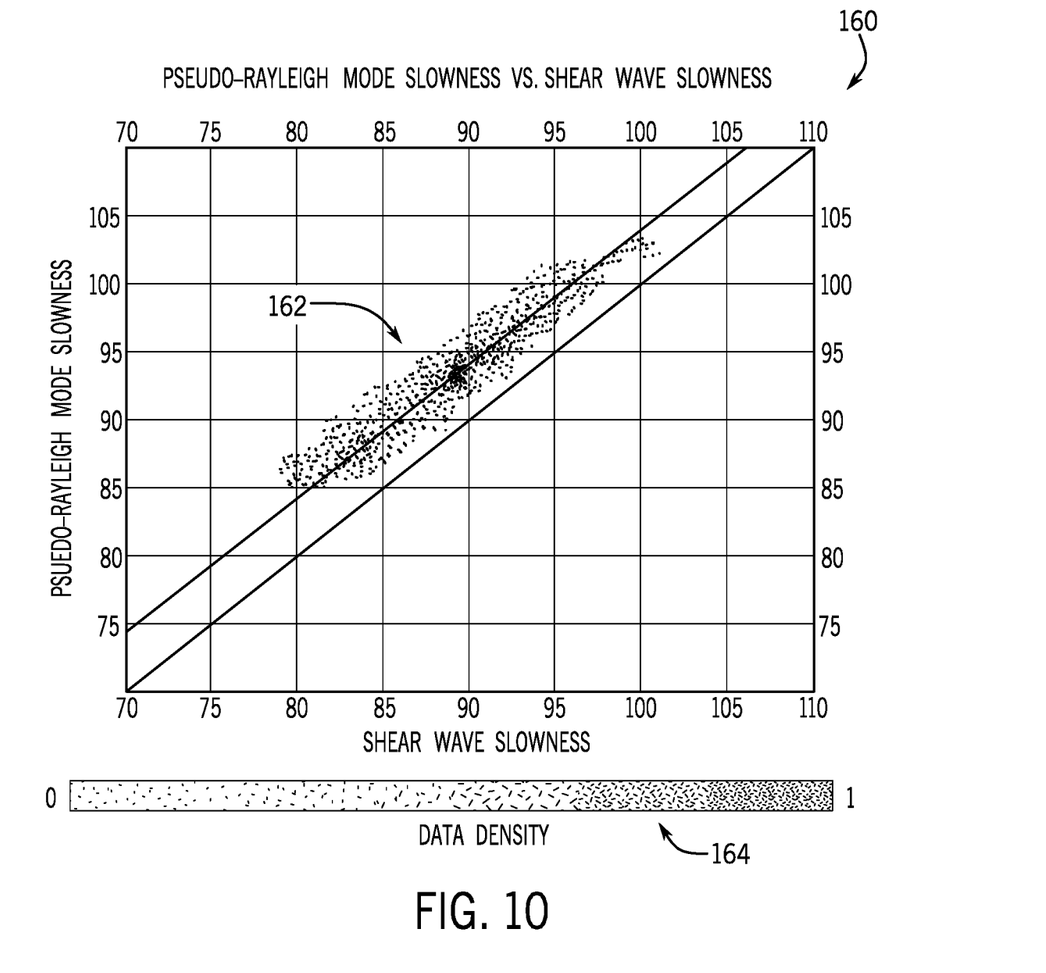
FIG. 10 is a graph illustrating a correlation between the empirically determined pseudo-Rayleigh mode and an estimated shear wave slowness, in accordance with an embodiment of the present disclosure.

FIG. 10 is a graph 160 that illustrates the empirical relationship between the measured pseudo-Rayleigh mode slowness and the shear wave slowness therefrom. As discussed above, various iterations of measurement may be taken by the acoustic tool 32. A data cluster 162 may be generated, which depicts each iteration of measurement. In some embodiments, a data density 164 may be displayed on the graph 160, which is indicative of the number of iterations of each measurement that may be taken. For example, certain colors, textures, or fills of the data cluster 162 may be indicative of a certain number of measurements that have been taken for a particular data entry.

Figure 11:
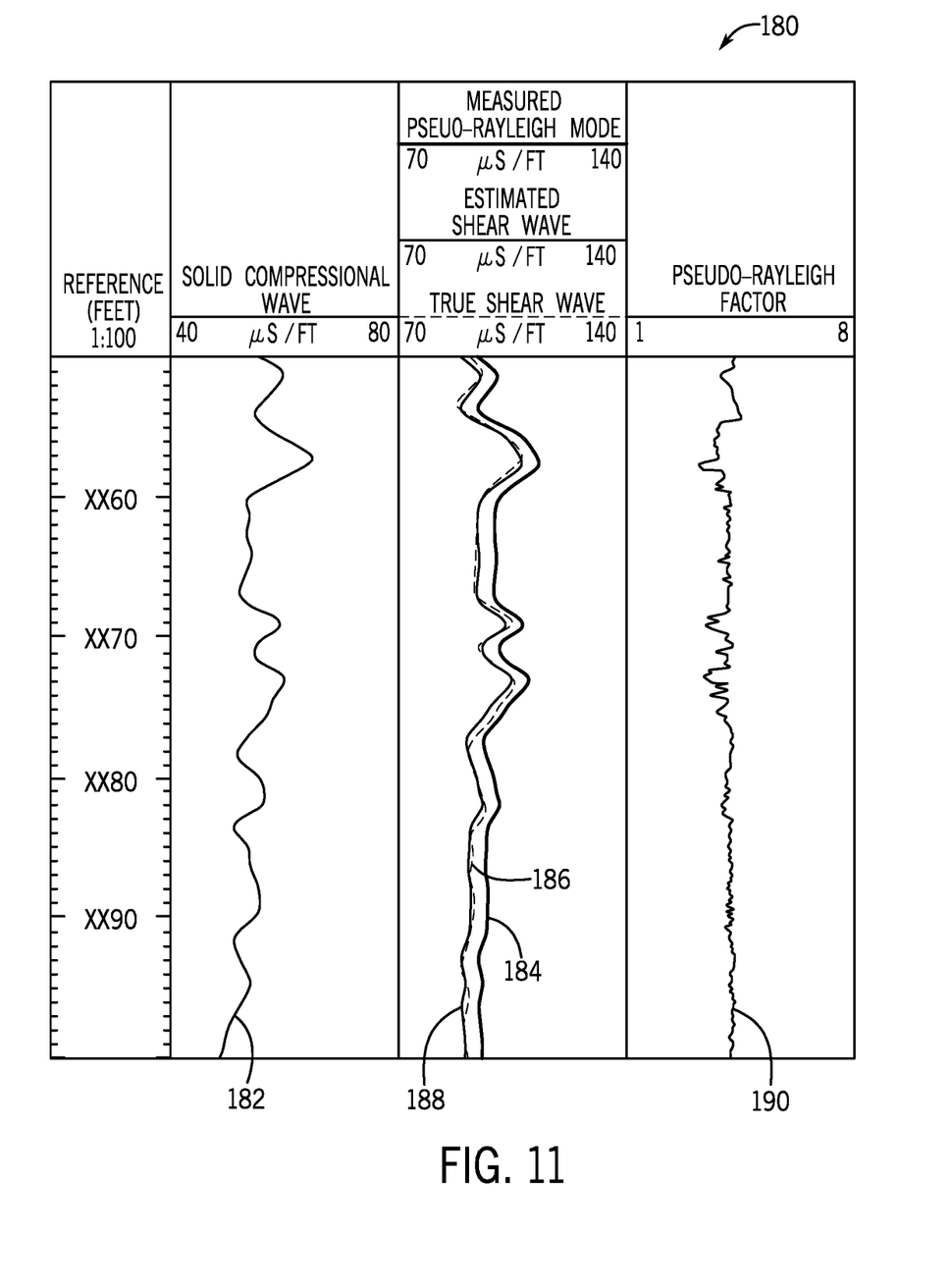
FIG. 11 is a graph illustrating the estimated shear wave determined using the method of FIG. 7, in accordance with an embodiment of the present disclosure.

FIG. 11 is an embodiment of a graph 180 that may be generated using the method described in flowchart 100, of FIG. 7. The graph 180 proves the viability of using this method to analytically determine an estimate of a shear wave slowness via a measured pseudo-Rayleigh mode slowness. The graph compares a slowness of several measured waveforms that may be present within the borehole 12 including the solid compressional wave 182, the pseudo-Rayleigh mode 184, and a true shear wave slowness 186 (e.g., measured via a sonic tool). The graph additionally shows an estimated shear wave slowness 188 and a pseudo-Rayleigh factor 190 corresponding to the measured pseudo-Rayleigh mode 184.

As discussed above, an analytical relationship, such as Equation I, may be used to estimate a shear wave slowness of the borehole 12 through detection and measurement of a pseudo-Rayleigh mode within the borehole 12. In the illustrated embodiment of FIG. 11, Equation I was used to obtain the estimated shear wave slowness 188 from the measured pseudo-Rayleigh mode 184. The estimated shear wave slowness 188 and the true shear wave slowness 186 may be substantially similar, thus proving the viability of estimating the shear wave slowness 188 from the measured pseudo-Rayleigh mode 184. As discussed above, if the pseudo-Rayleigh factor 190 is larger than 1, a stable pseudo-Rayleigh mode may exist within the borehole 12 and/or the geological formation 14. The pseudo-Rayleigh factor 190 may thus be used as a quality control measure to ensure the accuracy estimated shear wave slowness 188. Although the graph 180 pertains to results obtained from the method of flow chart 100, the graph 180 may be generated for any of the methods disclosed herein, the such as the methods of flow charts 80, 118, and 140, respectively.

The specific embodiments described above have been shown by way of example, and it should be understood that these embodiments may be susceptible to various modifications and alternative forms. It should be further understood that the claims are not intended to be limited to the particular forms disclosed, but rather to cover modifications, equivalents, and alternatives falling within the spirit and scope of this disclosure.

The invention claimed is:

1. A method for logging a subterranean formation penetrated by a fluid filled borehole, the method comprising:
rotating a logging tool in the fluid filled borehole, the logging tool including an ultrasonic emitter and a plurality of axially spaced ultrasonic receivers longitudinally spaced from the emitter;
causing the emitter to emit first and second ultrasonic waves into the borehole at corresponding first and second different azimuthal directions while said rotating the logging tool;
causing the plurality of receivers to receive corresponding first and second return waves, wherein the return waves include pseudo-Rayleigh waves;
generating first and second signals, wherein the signals comprise data descriptive of the corresponding return waves;
evaluating the signals via a processor to determine corresponding first and second pseudo-Rayleigh mode slowness values of the pseudo-Rayleigh waves; and
calculating, using an analytical relationship, first and second shear wave slowness values of the subterranean formation at the first and second different azimuthal directions corresponding to the first and second pseudo-Rayleigh mode slowness values, wherein the analytical relationship comprises a mathematical correlation between the pseudo-Rayleigh mode slowness and the shear wave slowness, wherein the analytical relationship comprises input parameters, and wherein the input parameters are physical parameters of the borehole.

2. The method of claim 1, wherein the first shear wave slowness and the second shear wave slowness are further processed to generate an azimuthal shear wave slowness map of the borehole.

3. The method of claim 1, wherein the input parameters are indicative of a density of fluid in the fluid filled borehole, a density of the formation, a slowness of fluid in the fluid filled borehole, a compressional slowness of the formation, or any combination thereof.

4. The method of claim 1, wherein the input parameters are indicative of geophysical and petrophysical parameters of the borehole, wherein the geophysical and petrophysical parameters comprise stand-off, formation triaxial stresses, Thomsen parameters for anisotropic formations, surface roughness, porosity, or any combination thereof.

5. The method of claim 1, wherein the analytical relationship comprises a term including a ratio of a density of the fluid to a density of the formation.

6. The method of claim 1, wherein said calculating using the analytical relationship comprises setting the following mathematical relationship equal to zero and solving for the shear wave slowness values:

$$F_{pR}(p) = -s_S^4 \frac{\rho_f}{\rho_s} \frac{\sqrt{p^2 - s_P^2}}{\sqrt{p^2 - s_f^2}} + (2p^2 - s_S^2)^2 - 4p^2\sqrt{p^2 - s_P^2}\sqrt{(p^2 - s_S^2)}$$

wherein $s_S$ represents the shear wave slowness of the formation, p represents the pseudo-Rayleigh wave slowness, $s_p$ represents a compressional wave slowness of the formation, $s_f$ represents a slowness of fluid the fluid filled borehole; $\rho_s$ represents a density of the formation, and $\rho_f$ represents a density of the fluid.

7. The method of claim 1, further comprising:
calculating first and second pseudo-Rayleigh wave factors corresponding to the first and second shear wave slowness values, wherein said pseudo-Rayleigh wave factors are indicative of a stability of the pseudo-Rayleigh mode.

8. The method of claim 7, wherein the pseudo-Rayleigh wave factors are calculated using the following mathematical equation:

$$f_{pR} = \frac{\rho_s}{\rho_f} \frac{\sqrt{s_f^2 - s_S^2}}{\sqrt{s_S^2 - s_P^2}}$$

wherein $f_{pR}$ represents the pseudo-Rayleigh wave factor, $s_S$ represents the shear wave slowness of the formation, $s_p$ represents a compressional wave slowness of the formation, $s_f$ represents a slowness of fluid the fluid filled borehole; $\rho_s$ represents a density of the formation, and $\rho_f$ represents a density of the fluid.

9. A method for logging a subterranean formation penetrated by a fluid filled borehole, the method comprising:
obtaining a database of sonic and ultrasonic borehole measurements including pseudo-Rayleigh mode slowness measurements, shear wave slowness measurements, fluid slowness measurements, compressional wave slowness measurements, fluid density values, and formation density values;
processing the database to determine an empirical relationship between the pseudo-Rayleigh mode slowness measurements and the shear wave slowness measurements;
rotating a logging tool in the fluid filled borehole, the logging tool including an ultrasonic emitter and a plurality of axially spaced ultrasonic receivers longitudinally spaced from the emitter;

causing the emitter to emit first and second ultrasonic waves into the borehole at corresponding first and second different azimuthal directions;

causing the plurality of receivers to receive corresponding first and second return waves, wherein the return waves comprise pseudo-Rayleigh waves;

evaluating the return waves to determine corresponding first and second pseudo-Rayleigh mode slowness values;

calculating, using the empirical relationship, first and second shear wave slowness values of the subterranean formation at the first and second different azimuthal directions corresponding to the first and second pseudo-Rayleigh mode slowness values.

10. The method of claim 9, wherein the first shear wave slowness and the second shear wave slowness are further processed to generate an azimuthal slowness map of the shear wave slowness of the borehole.

11. The method of claim 9, wherein said calculating further comprises processing at least one of the a slowness of the fluid, a density of the fluid, a compressional wave slowness of the formation, and a density of the formation in combination with the first and second pseudo-Rayleigh mode slowness values using the empirical relationship to calculate the corresponding first and second shear wave slowness values.

12. The method of claim 11, wherein said calculating further comprises processing the slowness of the fluid, the density of the fluid, the compressional wave slowness of the formation, and the density of the formation in combination with the first and second pseudo-Rayleigh mode slowness values using the empirical relationship to calculate the corresponding first and second shear wave slowness values.

* * * * *